Figure 1:
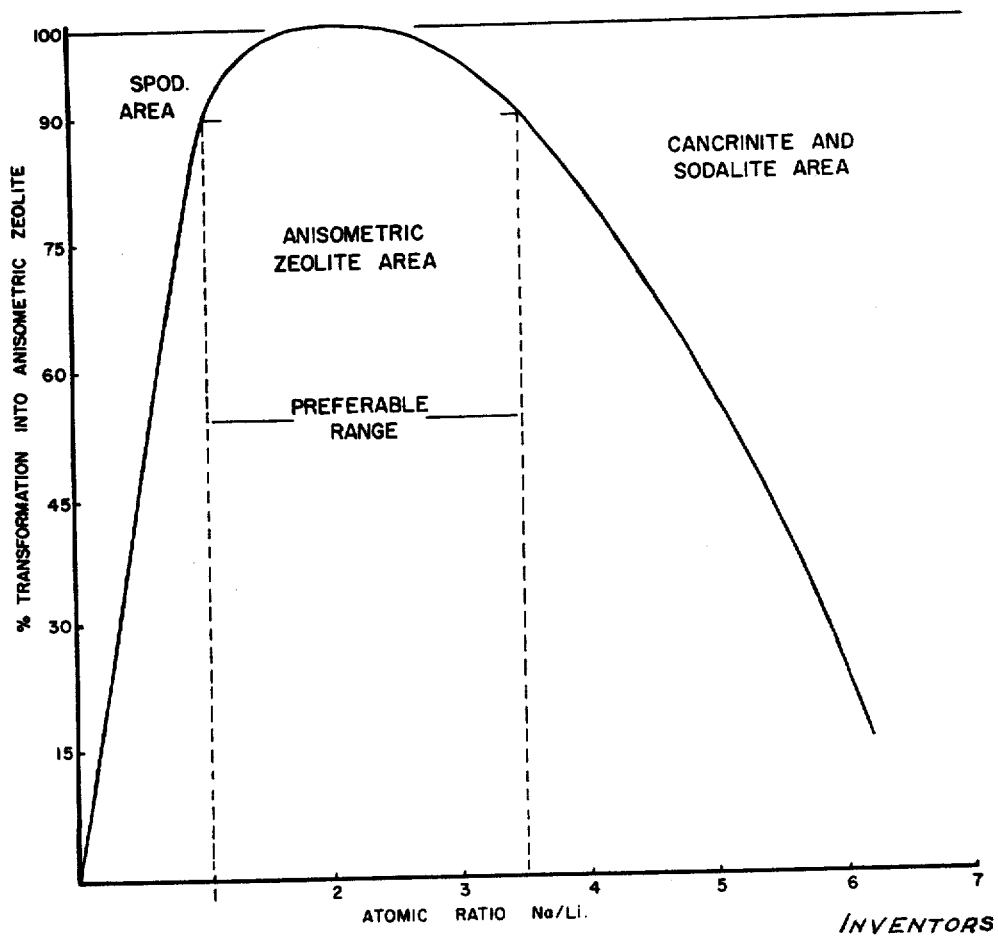

INVENTORS
Maurice ARCHAMBAULT
Charles A. OLIVIER
Henri-Paul LEMAY
Michel SAVARD

United States Patent Office 3,112,170
Patented Nov. 26, 1963

3,112,170
SODIUM-AMMONIUM COMPOUNDS PROCESS FOR EXTRACTING LITHIUM FROM SPODUMENE
Maurice Archambault, Quebec, Quebec, Charles A. Olivier, Ste.-Foy, Quebec, and Henri-Paul Lemay and Michel Savard, Quebec, Quebec, Canada, assignors to Department of Natural Resources of the Province of Quebec, Quebec, Quebec, Canada
Filed Jan. 16, 1961, Ser. No. 82,932
16 Claims. (Cl. 23—33)

This invention relates to the extraction of lithium from calcined lithium-bearing minerals. Particularly, it relates to the use of beta-spodumene as the starting material.

The prior art has suggested that caustic soda and sodium salts in general can be used with hot water to extract lithium from beta-spodumene. The suggestion is, however, that the yield of lithium is not good utilizing sodium compounds alone, except by using prohibitive amounts of water and by resorting to repetitive and elaborate precipitation and purification procedures. This is confirmed by the fact that the art has suggested an improvement, the use of both a sodium and a calcium compound for treatment of the lithium-containing material.

In contrast to these teachings, the applicants have now found that there are conditions under which lithium carbonate can be derived economically by the hydrothermal treatment of beta spodumene or other acceptable lithium-bearing materials, in the presence of relatively small amounts of water, with a chemical selected from the group consisting of sodium hydroxide, sodium pyroborate, sodium orthoborate, sodium sulphides and sodium silicates, the aqueous sodium compounds of this group having the common characteristic of a pH above about 12.

The applicants have also found that the action of any chemical selected from the group mentioned above was considerably impaired by addition of the corresponding aqueous calcium salt.

In accordance with the invention, the sodium-bearing compound in aqueous solution is brought into contact with the lithium-bearing charge in the presence of water in an amount from about 1 to about 10 times the weight of the lithium-bearing material and the quantity of sodium compound being at least what is theoretically required to react with the $Li_2O$ present in the charge. The temperature should be within the range from about 70° C. to about 130° C. When the reaction is effected at above 105° C., a pressure vessel must be used to prevent water from leaving the reaction mixture. An aqueous slurry is thus formed containing anisometric sodic zeolite together with a silicated lithium compound of neo-formation.

The slurry or the solids from the slurry are cooled and then contacted in presence of water at a temperature within the range from about 0° C. to about 40° C. with ammonium carbonate in an amount not exceeding about 25 times the weight of the lithium oxide present. The anisometric sodic zeolite is thus changed to an ammoniated zeolite, whereas the newly formed silicated lithium compound is converted to a complex carbonate of lithium and ammonium, which is very soluble in cold water. The ammoniated zeolite and silicic residue are then separated from the lithium-bearing solution, which contains also the sodium recovered from the sodic zeolite. The solution is then heated to drive off carbon dioxide and ammonia gases, so as to insolubilize lithium carbonate while the sodium remains in solution. This solution, after proper treatment may be advantageously returned to the process for decomposing a new lithium-bearing charge. The solid residue left after lithium and sodium extraction is mainly constituted of ammoniated zeolite and may be sold as such or it could be heated to volatilize its ammonia content which may be returned to the leaching process, while the remainder of the residue is discarded.

The amounts of sodium compounds used are critical. Indeed, when treating beta-spodumene with any of the sodium compound mentioned above, four different sodium aluminosilicates are liable to form, depending on the temperature and on the amount of the sodium compound used with respect to the lithium content of the charge.

The sodium aluminosilicates that could be produced are:

(1) An anhydrous aluminosilicate jadeite-like in chemical composition: $(Na_2O.Al_2O_3.4SiO_2)$ (2) A sodic cancrinite approximating:

$(3Na_2O.4Al_2O_3.9SiO_2.2Na_2CO_3.3H_2O)$ (3) A chlorine-free sodalite approximating:

$(3Na_2O.3Al_2O_3.6SiO_2.Na_2CO_3)$ (4) An anisometric sodic zeolite:

$(Na_2O.Al_2O_3.2SiO_2.yH_2O)$

In the applicants' process the only sodium aluminosilicate of interest is the anisometric zeolite. To obtain this zeolite, the atomic ratio of the sodium in the reactants to the lithium in the charge should not exceed about 3.5, otherwise sodic cancrinite or sodalite would be formed. The formation of the two latter products must be avoided in this process: (a) they are reactant-wasting because of their high sodium contents and (b) their sodium is not recoverable by treatment with aqueous ammonium carbonate. Is also taboo the formation of the anhydrous sodium aluminosilicate, since it causes a lower lithium extraction yield and hinders the recovery of its sodium content, by the ammonium carbonate treatment.

This is illustrated graphically in FIG. 1 in which atomic ratio of sodium is plotted against the percent of transformation into anisometric zeolite. Referring to the drawing, the atomic ratio of the sodium content of the reactant to the lithium content of the charge should not exceed about 3.5. The critical range for the formation of the latter is illustrated.

When the atomic ratio of the sodium in the reactant to the lithium in the charge exceeds about 3.5, the by-products formed are sodic cancrinite and sodalite.

DECOMPOSING

The use of the sodium compounds mentioned above as reactants gives unusual results in the applicant's process. It is noteworthy that the reaction works as well with a low-grade lithium ore as with a high-grade lithium concentrate, and this, without any additional consumption of the sodium-bearing reactant. Almost complete recoveries of lithium may be obtained, provided that the sodium-bearing reactant is supplied in an amount at least stoichiometric and preferably in a quantity ranging from about 1.1 to about 2.5 times the theoretical amount. However, with sodium hydroxide, the preferred amount is from about 1.1 to about 1.3 times the theoretical.

The applicants have found that an amount of water lower than about 1.5 times the weight of the lithium-bearing charge may cause excessive thickening of the slurry together with the formation of undesirable products. The amount of water recommended is from about 1.5 to about 10 times the weight of the lithium-bearing charge, and preferably from about 1.5 to about 4 times.

Temperature and time of reaction depend on each other: the higher the temperature, the faster the reaction is completed. Reaction time may vary from about 1 hour to 48 hours and the temperature may range from about 70° C. to about 130° C. At atmospheric pressure, i.e. at a temperature from about 70° C. to about 105° C., the time required for decomposing varies approximately from 6 to 48 hours, whereas, at superatmospheric pressure, i.e., at a temperature from about 105° C. to about 130° C., the time is from about 1 to about 6 hours. Both factors are also dependent on the excess of the sodium-bearing reactant used. But in every case, within these ranges, the reaction will almost reach completion, if the reaction time is sufficiently long.

In the decomposing step, the lithium appears to be taken out of the spodumene molecule together with half of its silica content, whereas an insoluble lithium silicate is apparently formed, which will be converted into lithium carbonate in a subsequent leaching operation that will be discussed now.

LEACHING

The leaching, as proposed by the applicants, is part of the invention and is of primary importance. This operation owes its surprising effectiveness to the use of ammonium carbonate. The functions of the aqueous ammonium carbonate are various and can best be summarized by the following approximate equation:

$Li_2O.2SiO_2 + Na_2O.Al_2O_3.2SiO_2.xH_2O +$ water
$+ 4(NH_4)_2CO_3 \rightarrow (NH_4)_2O.Al_2O_3.2SiO_2.xH_2O$
$+ [(NH_4)_4.Li_2(CO_3)_3] + Na_2CO_3 + 2Si(OH)_4$
$+ 2NH_4OH +$ water This equation shows the effect of the ammonium carbonate solution on the products obtained in the decomposing step, that is, on the anisometric sodic zeolite and on the lithium silicated compound. The undissolved lithium of the slurry is apparently brought into solution by the formation of an isomorphous ammonium and lithium carbonate. This complex salt would have a variable composition and is tentatively represented by the following formula:

$$(yNH_4.zLi)CO_3$$

$y + z$ being equal to 2.

In actual cases, to favour leaching with minimum amount of water, it is recommended to give to $y$ a value at least equal to $z$ or preferably about two times greater, but in most occassions not exceeding three times.

The essential functions of ammonium carbonate may be explained as follows: as the anisometric sodic zeolite formed in the decomposing step has the property of being of the ion-exchanger type, the $NH_4$ ions of the ammonium carbonate take the place of the Na ions of the sodic zeolite, the latter ions being recovered as sodium carbonate. Sodium carbonate remains as such in the solution, the formation of sodium silicate being prevented by the presence of the ammonium compound in the solution. In this way, silica has no interfering effect on the technology of the process. The solid residue left after leaching is essentially an ammoniated zeolite, which could be sold for catalyst carriers, ion exchangers, fillers, etc. As an alternative, the $NH_4$ ions of the ammoniated zeolite may be recovered under the form of $NH_3$ gas by simply heating it at a temperature between 150° C. and 500° C., preferably around 400° C., in a neutral or slightly reducing atmosphere. Ammonium ions may also be displaced from the zeolite by various other means. For instance, the residue may be mixed with milk of lime or with aqueous barium or strontium hydroxides, at temperatures of about 80° C.:

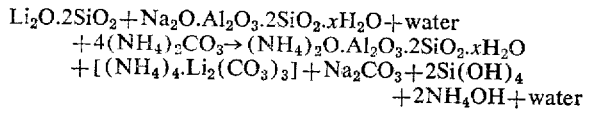

Another way of recovering the ammonium is to react the residue with solution of polyvalents salts (e.g. ferrous salts). After the recovery of $NH_3$, the final residue is under a semi-processed form that could be the departure of interesting work on the recovery of other valuable components of this residue.

In practice, the leaching operation may be carried on in various ways. Volume of water, quantity and concentration of ammonium carbonate, number of leaching steps, may all be varied. Temperature and time themselves may vary from 0° C. to 40° C. and from 5 minutes to 2 hours respectively. As a general rule, it can be said that the volume of water needed to solubilize the complex isomorphous mixture of ammonium and lithium carbonate and the sodium of the residue, decreases as the concentration of ammonium carbonate in solution increases.

Any type of ammonium carbonate may be used, but normal carbonate $[(NH_4)_2CO_3]$ is preferred because of its greater solubility in water (up to 100 parts dissolved in 100 parts of water at 15° C.).

The weight ratio of water to lithium-bearing material in the leaching operation may vary from 1 to 10, depending on the strength of the ammonium carbonate solution. It is however preferable to use generally the greatest practical concentration of ammonium carbonate in order to minimize the amount of water. The mother solution itself may be used as leaching medium; but this is recommended principally when small excess of reactant has been used. Indeed, when high excess of chemical reactant was employed in the decomposing step, there is a too large amount of unreacted chemical, and this would tend to promote the formation of undesirable side reactions with ammonium carbonate.

Furthermore, when the mother liquor is used as leaching medium, an evaporation step is eliminated since no external leach water is added to dissolve the ammonium carbonate and to extract the lithium.

The amount of ammonium carbonate used in the leaching operation of the applicants' process must be over 3 times the weight of the lithium oxide present, so as to supply at least one mole of $(NH_4)_2CO_3$ for each mole of $Li_2O$ to be leached. Preferably, ammonium carbonate should be used in amounts varying from about 5 to about 25 times the weight of the lithium oxide present.

When the leaching operation is completed, the slurry is filtered to separate, from the insoluble solid residue, a clear solution, practically free from silica and the other common impurities ($R_2O_3$.Fe, etc.), and containing the major part of the isomorphous mixture of ammonium and lithium carbonate, and also of the sodium carbonate. However, as the solid residue has the property of withholding much water as cake moisture, a subsequent washing is required to take out of the cake the remaining lithium and sodium. Evidently, this is particularly indispensable when the leaching has been done with a small amount of solution, because of the high lithium and sodium contents of the latter. It is obvious that the amount of water used in the washing operation will be such that it lends itself to sound economics.

INSOLUBILIZING

The next step in the applicants' process is to insolubilize the lithium carbonate produced and dissolved during the leaching operation. This insolubilizing step owes its surprising effectiveness to the following properties of the carbonates present: (a) the instability of the complex or isomorphous mixture of ammonium and lithium carbonate which tends to dissociate into $Li_2CO_3$ and $(NH_4)_2CO_3$ when submitted to appropriate physical means, (b) the instability of $(NH_4)_2CO_3$ which also tends to dissociate into its individual constituents $NH_3$ and $CO_2$, and (c) the relative water-insolubility of $Li_2CO_3$.

Among the physical means which can be used to effect the above dissociation, there are heat, beating, agitation, ultrasonics, vacuum, etc. For instance, when heat is used, the leaching and washing solutions are brought up to between around 60° C. and about 100° C., whereby the $(yNH_4.zLi)CO_3$ dissociates into $Li_2CO_3$ and $(NH_4)_2CO_3$, the latter splitting into $NH_3$ and $CO_2$ gases which are recovered to make up anew $(NH_4)_2CO_3$; and thus marketable $Li_2CO_3$ is insolubilized. It is obvious that the higher the temperature, the faster the dissociation of the isomorphous mixture of ammonium and lithium carbonate and the insolubilizing of the $Li_2CO_3$. The crystalline lithium carbonate is recovered by simply separating it from the hot solution by filtration or centrifugation.

By proper treatment of the remaining solution, the sodium-bearing compound, which was used as reactant for spodumene, may be reformed and reused to treat new beta-spodumene. For example, when the decomposing was effected with sodium hydroxide, the sodium-bearing solution left after lithium carbonate precipitation, may be causticized with an aqueous alkaline earth hydroxide, such as $Ca(OH)_2$ at a temperature of around 80° C. by currently used methods to regenerate the NaOH needed for the reaction. So those skilled in the art will conclude that the sequence of the operations of the process may easily be made cyclic in a number of different advantageous ways, due to the fact that the sodium ions used up in the reacting mixture as reactant are regenerated by ammonium carbonate and returned to the decomposing step with the unspent sodium.

Calcined lepidolite, petalite and eucryptite would behave essentially like beta-spodumene, giving approximately the same reaction products as those mentioned above.

The minimum temperatures required for calcining the above minerals are as follows: above about 850° C., for lepidolite; above about 980° C., for eucryptite; and above about 680° C., for petalite.

The invention has been generally described and it will now be explained in further details by reference to satisfactory apparatus and procedures.

TECHNOLOGY

The calcined lithium-bearing silicate is preferably pulverized to pass a 100–200 mesh screen and analyzed. The product is then delivered to a slurry tank containing the proper amount of a solution of sodium hydroxide or of any of the sodium salts mentioned above. From the slurry tank, the reaction mixture is pumped to a heated reactor. To prevent water from leaving the reaction mixture, the reactor is either a covered vat (for temperatures below 105° C.) or a continuous autoclave (for temperatures above about 105° C.). Since the highest temperature recommended is 130° C., the pressure does not go higher than about 40 p.s.i. In any case, the vessel must be well insulated against heat loss and it should be equipped with an efficient stirring device.

From the reactor, the slurry may be handled in two different ways. First, when a small excess of reactant was used as in the case of sodium hydroxide, the slurry may be immediately cooled and transferred to a leaching tank where ammonium carbonate is added with the amount of water necessary to attain the proper dilution. Second, when a large excess of reactant was used in the decomposing step, the treated slurry coming out of the reactor is immediately filtered while still hot and the filtrate is reused in the decomposing step, while the solids are cooled and contacted with the proper amount of an ammonium carbonate solution so as to ensure a complete solubilization of the available lithium and exchange between the sodium ions of the zeolite and the ammonium ions of the solution. In either cases, the result is good. Then the resultant cold slurry is filtered on a drum filter or centrifuged, thus effecting the separation of the solid ammoniated zeolite from the solution containing the recovered sodium carbonate and the newly formed ammonium lithium carbonate complex. The insoluble residue may then be heat-treated in a slightly reducing atmosphere within a rotary kiln or in a multi-hearth furnace to recover its ammonium content.

On the other hand, the solution is heated in an agitated tank to drive off carbon dioxide and ammonia gases, thus causing the simultaneous insolubilization of marketable lithium carbonate. This piping-hot lithium carbonate slurry is immediately filtered or centrifuged; the lithium carbonate is then dried while the solution after being treated, as for example, by causticizing in the case of sodium hydroxide is returned to the process.

In view of completing the description of the applicants' process, examples are given below to illustrate various arrangements possible when using an aqueous chemical selected from the group consisting of sodium hydroxide (NaOH), sodium pyroborate ($2Na_2O.B_2O_3$), sodium orthoborate ($3Na_2O.B_2O_3$), sodium metasilicate ($Na_2SiO_3$)

sodium orthosilicate ($Na_4SiO_4$), and sodium sulphides ($Na_2S$) and (NaHS).

GENERAL EXAMPLES

All tests of the examples given in Table 1 below were run practically the same way. The lithium-bearing charge was a calcined spodumene concentrate, containing about 4.5% $Li_2O$, and corresponding approximately to a mixture of 60% beta-spodumene, 25% feldspars (Na, K, Ca, Al silicates) and 15% quartz (free silica).

The amounts of the sodium compounds used in the decomposing step were calculated after the $Li_2O$ content of the charge. The decomposing of the lithium-bearing charges was effected under agitation at the temperature and for the length of time mentioned in the table. The aqueous reaction products were then filtered on a vacuum filter, the filtration being done at temperature over 90° C.

The wet solid residues, thus obtained were cooled, then contacted with same amount of ammonium carbonate and same amount of water. The leachings were run for about half an hour at room temperature. The resulting slurries were then filtered. For some of the experiments, an additional washing of the filter cake was effected at room temperature with a small amount of water. The final residues were then submitted to analysis for their lithium and sodium contents, so as to establish their relative extraction.

there in the whole circuit are grouped and expressed by a single figure. The next filtering step (8) can also be

*Table 1*

EFFECT OF VARIOUS FACTORS ON LITHIUM EXTRACTION AND ON SODIUM REGENERATION

| Test No. | Decomposing step[1] | | | | Leaching results[2] | |
|---|---|---|---|---|---|---|
| | Reactant | | Reaction | | $Li_2O$ Rec., percent | $Na_2O$ Regen., percent |
| | Used | Theor. amt. percent | Temp., C. | Time, hrs. | | |
| LS-86 | NaOH | 175 | 70-75 | 47 | 70 | [3]>100 |
| EX-1 | NaOH | 179 | 90-95 | 20 | 90 | 93 |
| LS-114 | NaOH | 100 | 125-130 | 4 | 87 | [3]>100 |
| LS-9 | NaOH | 183 | 125-130 | 1 | 93 | 70.6 |
| LS-87 | $Na_2SiO_4$ | 180 | 90-95 | 24 | 78 | [3]>100 |
| LS-88 | $Na_2SiO_4$ | 181 | 90-95 | 24 | 81 | [3]>100 |
| LS-120 | $Na_2SiO_4$ | 100 | 125-130 | 4 | 67 | 92.2 |
| LS-137 | $Na_2SiO_4$ | 150 | 125-130 | 4 | 90 | 48 |
| LS-90 | $2Na_2O.B_2O_3$ | 180 | 90-95 | 24 | 83.5 | 91.6 |
| LS-124 | $2Na_2O.B_2O_3$ | 100 | 125-130 | 4 | 79 | 93.4 |
| LS-141 | $3Na_2O.B_2O_3$ | 138 | 90-95 | 24 | 77 | 88 |
| LS-121 | $3Na_2O.B_2O_3$ | 100 | 125-130 | 4 | 84 | 89.8 |
| LS-139 | $3Na_2O.B_2O_3$ | 150 | 125-130 | 4 | 88 | 73 |
| LS-93 | $Na_2S$ | 150 | 90-95 | 24 | 78 | [3]>100 |
| LS-122 | $Na_2S$ | 100 | 125-130 | 4 | 84 | [3]>100 |
| LS-140 | $Na_2S$ | 150 | 125-130 | 4 | 87 | 91 |

[1] In the decomposing step, the amount of water was 4 times the weight of the lithium-bearing charge.

[2] The leaching was effected with water in an amount 5 times the weight of the lithium-bearing charge and with an amount of ammonium carbonate equal to the weight of the lithium-bearing charge.

[3] Results showing sodium regeneration over 100% indicate that a part of the sodium from the feldspar contained in the concentrate has been extracted.

Figure 2:
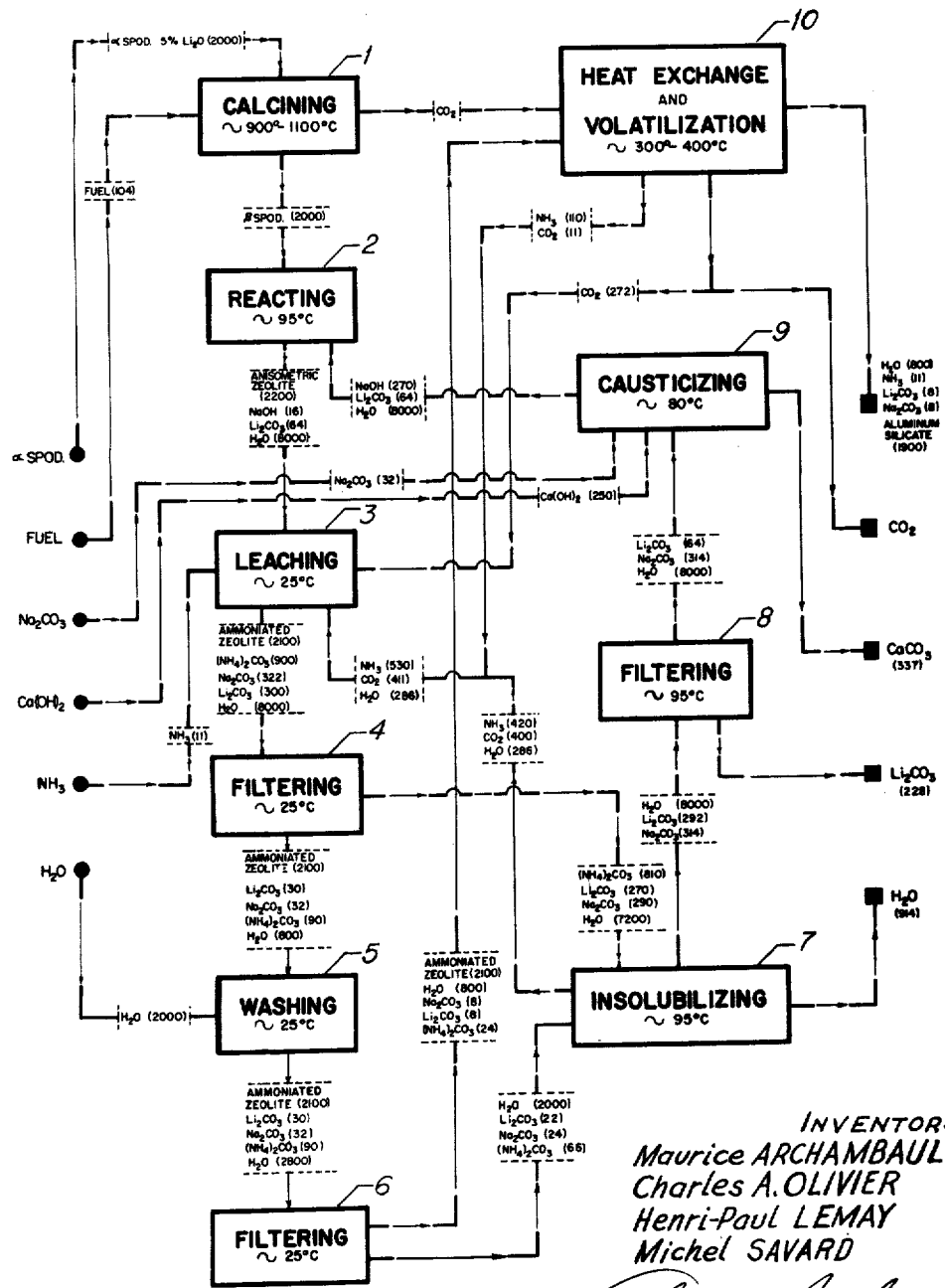

To illustrate the special features of the applicants' process, the following non-limitative example is supplied through FIGURE 2, as one of the preferred arrangements. FIGURE 2 is a quantitative diagram showing the production of lithium carbonate with concomitant regeneration and recycling of the sodium used in the decomposing step.

The data given in FIGURE 2, based on laboratory results, are those that could be obtained with proper equipment. Spodumene concentrate, in its natural or alpha form is first calcined (step 1) in a known manner to transform it into beta spodumene. In this example, "bunker C oil" is used for this calcining. The beta spodumene is then reacted (step 2) with an aqueous solution of NaOH, which, in the cyclic process, is hot saturated with $Li_2CO_3$ and comes from the causticizing (step 9). In this step, about 94% of the beta spodumene is transformed into the anisometric zeolite. The anisometric zeolite thus produced is then leached (step 3) with ammonium carbonate reformed from $NH_3$ and $CO_2$ and water vapor that came from the decomposition, from the previous insolubilizing step (7), of the same ammonium carbonate, and also from the volatilization step (10).

In the step (3) about 90% of the sodium of the anisometric zeolite is extracted by ammonium carbonate, and an ammoniated zeolite is formed. It is to be noted that the leaching is made by using the mother liquor as aqueous leaching medium. In the filtering step (4), the quantity of solution retained in the residue as moisture should be reduced to minimum because this solution contains an appreciable amount of sodium and lithium carbonate. This can be done by using appropriate centrifugal or press filters. To fix the ideas, the applicants used, here, 40% (dry basis) as cake moisture. A further washing (step 5) and filtering (step 6) are needed to purify the residue from any valuable soluble material. In this example, heat is used to insolubilize (step 7) the lithium carbonate from the solutions coming from steps (4) and (6). The water loss specified in this step (7) represents the probable total loss of water along all the circuit. Some unavoidable losses of water here and there in the whole circuit are grouped and expressed by a single figure. The next filtering step (8) can also be made by centrifugation to recover the $Li_2CO_3$ whose purity stands over 98%.

The regeneration of the NaOH needed in the reacting step (2) is made in the causticizing step (9) worked in a known manner. The volatilization step (10) is run at 400° C., in this example, because the heating is effected only with the excess calories supplied when calcining spodumene at temperatures around 1000° C. There is 90% recovery of the ammonium content of the ammoniated zeolite. So, with proper equipment, by using 104 lb. bunker C oil, 32 lb. $Na_2CO_3$, 250 lb. $Ca(OH)_2$, 11 lb. $NH_3$, and 2000 lb. $H_2O$, in a cyclic process, one ton of formed to give 228 lb. of $Li_2CO_3$ over 98% pure, 1900 alpha spodumene, containing 5% $Li_2O$ can be trans- lb. of aluminum silicate and 337 lb. of $CaCO_3$, which means that up to 91% of the $Li_2O$ contained in the starting spodumene may be recovered in the form of marketable lithium carbonate.

PRIOR ART EXAMPLES

The way of proceeding for the decomposing, leaching and filtration in the prior art examples, reported in Table II below was as follows: a beta-spodumene concentrate similar to the one used for previous examples was mixed with different amounts of NaOH and $Ca(OH)_2$, the molar ratio NaOH:$Ca(OH)_2$ being constant and equal to 2. For all the cases, an amount of water equal to 4 times the weight of spodumene concentrate was added. The slurry thus obtained was then heated under constant agitation within an autoclave for the length of time and at the temperature mentioned in the table. After the decomposing, the slurry was filtered at 90° C. It was found that, in the solid residue, the beta-spodumene had almost totally disappeared. The leaching of the filtration cake was done with water only, in an amount 4 times the weight of the dry lithium-bearing charge. After being agitated for half an hour at 90° C. the slurry was filtered while still hot; then a further washing was done on the residue with an amount of water equal to the weight of the dry lithium bearing charge before being submitted to analysis for their lithium and sodium contents, so as to establish their relative extraction .

Table II

JOINT ACTION OF CALCIUM AND SODIUM COMPOUNDS

The effect of various factors on lithium extraction:

| Test No. | Decomposing step | | | Leaching results [2] |
|---|---|---|---|---|
| | React.[1] theor. amt., percent | Reaction | | Li2O recovery, percent |
| | | Temp., °C. | Time, hrs. | |
| LS-115 | 100 | 130 | 4 | 27.5 |
| LS-116 | 50 | 130 | 4 | 26.5 |
| LS-117 | 100 | 200 | 0.5 | 17.0 |
| LS-118 | 50 | 200 | 0.5 | 9.5 |
| LS-126 | 200 | 125 | 4 | 59.0 |

[1] The reactants used for these experiments were mixtures of sodium and calcium hydroxides with a molar ratio of NaOH:Ca(OH)2 always equal to 2.
[2] The reaction product was leached with water only, in an amount equal to about 5 times the weight of the lithium-bearing charge.

The applicants claim:

1. A process for extracting lithium from a calcined lithium-bearing silicate, comprising, reacting said silicate hydrothermally with an aqueous solution of a chemical selected from the group consisting of sodium hydroxide, sodium pyroborate, sodium orthoborate, sodium sulphides, and sodium silicates at a temperature within the range from about 70° C. to about 130° C., the chemical being used in an amount from about 1.1 to about 3.5 times the stoichiometric amount required to react with the lithium present in the charge for a time within the range from about 6 to about 48 hours thereby to produce an aqueous slurry containing a silicated lithium compound and sodium aluminosilicate, leaching said resulting mixture with aqueous ammonium carbonate to solubilize the lithium and sodium content and to form a solid residue.

2. A process, as defined in claim 1, wherein the chemical selected from said group is used in a quantity ranging from about 1.1 to about 2.5 times the stoichiometric amount.

3. A process, as defined in claim 1, wherein water is present in said aqueous chemical in an amount ranging from about 1.5 to about 10 times the weight of the lithium-bearing charge.

4. A process, as defined in claim 1, wherein water is present in the aqueous chemical in an amount from about 1.5 to about 4 times the weight of the lithium-bearing charge.

5. A process, as defined in claim 1, wherein the primary reaction is performed at a temperature within the range from about 70° C. to about 130° C. to produce an aqueous slurry containing anisometric sodic zeolite and a silicated lithium compound.

6. A process, as defined in claim 1, wherein the primary reaction is performed, at atmospheric pressure at a temperature from about 70° C. to about 105° C., and for a time ranging from about 6 hours to about 48 hours, to produce an aqueous slurry containing anisometric sodic zeolite and silicated lithium compound.

7. A process, as defined in claim 1, wherein the primary reaction is performed, at superatmospheric pressure, at a temperature from about 105° C. to about 130° C., and for a time ranging from about 1 hour to about 6 hours, to produce an aqueous slurry containing anisometric sodic zeolite and silicated lithium compound.

8. A process for producing lithium carbonate from calcined lithium-bearing silicate, which comprises: contacting said silicate with an aqueous chemical selected from the group consisting of sodium hydroxide, sodium pyroborate, sodium orthoborate, sodium sulfides and sodium silicates, said chemical being used in an amount from about 1.1 to about 3.5 times the stoichiometric amount required to react with the lithium present in the charge and the temperature being within the range from about 70° C. to about 130° C. thereby to form a mixture containing anisometric sodic zeolite and silicated lithium compound; leaching the mixture with ammonium carbonate and cold water thereby to solubilize its lithium content in the form of a carbonate in water and to remove the sodium from the anisometric sodic zeolite as a dissolved carbonate; separating from the solution the solid residue; treating the solution by physical means to evolve carbon dioxide and ammonia gases and to insolubilize thereby the lithium carbonate; and recovering crystalline lithium carbonate.

9. A process for producing lithium carbonate from calcined lithium-bearing silicate, which comprises: (a) Decomposing said silicate hydrothermally with an aqueous chemical selected from the group consisting of sodium hydroxide, sodium pyroborate, sodium orthoborate, sodium sulfides and sodium silicates, in a quantity ranging from about 1.1 to about 3.5 times the stoichiometric amount required to react with the lithium contained in the charge, in presence of water in an amount ranging from about 1.5 to about 10 times the weight of the lithium-bearing charge, at a temperature within the range from about 70° C. to about 130° C., to produce an aqueous mixture containing anisometric sodic zeolite and silicated lithium compound; (b) Leaching the mixture obtained in the decomposing step by contact at a temperature from about 0° C. to about 40° C., with an aqueous solution of ammonium carbonate, said ammonium carbonate being in an amount from about 5 to about 25 times the weight of the lithium oxide present in the calcined lithium-bearing silicate, thereby to solubilize its lithium content in water and to remove the sodium from the anisometric sodic zeolite, regenerating thereby the sodium required in the decomposing step, and separating the solid residue containing an hydrated ammonium aluminosilicate from the lithium carbonate-bearing solution; (c) Insolubilizing the lithium content of the solution obtained in the leaching step by heating and agitating said solution at a temperature from about 60° C. to about 100° C., to drive off carbon dioxide and ammonia gases, and separating crystalline lithium carbonate from the mother liquor, and (d) Recovering separately lithium carbonate and a by-product consisting of an anisometric ammoniated zeolite.

10. A cyclic and regenerative process for producing lithium carbonate from calcined lithium-bearing silicate, which comprises the steps of continuously (a) Decomposing said silicate with aqueous sodium hydroxide in an amount from about 1.1 to about 3.5 times the stoichiometric amount required to react with the lithium present in the charge and the temperature being within the range from about 95° C. to about 130° C. thereby to form a aqueous mixture containing anisometric sodic zeolite and silicated lithium compound; (b) Leaching the mixture with ammonium carbonate and cold water thereby to solubilize its lithium content in the form of a carbonate and to remove the sodium from the anisometric sodic zeolite, regenerating thereby the sodium required in the decomposing step; separating the solid residue from the lithium carbonate-bearing solution; (c) Insolubilizing the lithium content of the solution obtained in the leaching step by physical means to evolve carbon dioxide and ammonia gases in which there is present an amount of ammonium carbonate from 5 to 25 times the weight of the lithium oxide present in the calcined lithium-bearing silicate gases causticizing and recycling said mother liquor to the process; and (d) Recovering separately a lithium carbonate and a by-product consisting of an anisometric hydrated ammonium aluminosilicate produced in the leaching step, treating said hydrated ammonium aluminosilicate to evolve its ammonia as a gas, returning said regenerated gas to the leaching step.

11. A cyclic and regenerative process for producing lithium carbonate from calcined lithium-bearing silicate, which comprises the steps of continuously (a) Decomposing said silicate hydrothermally with sodium hydroxide in quantity ranging from about 1.1 to about 2.5 times the stoichiometric amount required to react with the lithium contained in the charge, in presence of water in an amount ranging from about 1.5 to about 10 times the weight of the lithium-bearing charge, at atmospheric pressure and at a temperature within the range from about 70° C. to about 105° C., for a time from about 6 hours to about 48 hours, to produce an aqueous mixture containing anisometric sodic zeolite and silicated lithium compound of; (b) Leaching the mixture obtained in the decomposing step by contacting it at a temperature from about 0° C. to about 40° C., with an aqueous solution of ammonium carbonate, in which there is present an amount of ammonium carbonate from 5 to 25 times the weight of the lithium oxide present in the calcined lithium-bearing silicate to solubilize its lithium content in water and to remove the sodium from the anisometric sodic zeolite produced, regenerating thereby the sodium required in the decomposing step, and separating the solid residue containing an hydrated ammonium aluminosilicate from the lithium carbonate-bearing solution; (c) Insolubilizing the lithium content of the solution obtained in the leaching step by heating and agitating said solution at a temperature from about 60° C. to about 100° C., to drive off carbon dioxide and ammonia gases returning said gases to the leaching step, and separating crystalline lithium carbonate from the mother liquor, causticizing said mother liquor at around 80° C. with an alkaline earth hydroxide, to convert its sodium carbonate content into sodium hydroxide, returning said sodium hydroxide to the decomposing step to react anew with fresh calcined lithium-bearing silicate; and (d) Recovering separately lithium carbonate and a by-product consisting of an anisometric ammoniated zeolite produced in the leaching step, and heating said ammoniated zeolite at above around 400° C., to evolve its ammonia as a gas, returning said regenerated gas to the leaching step.

12. A cyclic and regenerative process for producing lithium carbonate from calcined lithium-bearing silicate, which comprises the steps of continuously: (a) Decomposing said silicate hydrothermally with sodium hydroxide in quantity ranging from about 1.1 to about 1.3 times the stoichiometric amount required to react with the lithium contained in the charge, in presence of water in an amount ranging from about 1.5 to about 4 times the weight of the lithium-bearing charge, under pressure at a temperature within the range from about 105° C. to about 130° C., for a time from about 1 to about 6 hours, to produce an aqueous mixture containing anisometric sodic zeolite and silicated lithium compound; (b) Leaching the mixture obtained in the decomposing step by contacting it at a temperature from about 0° C. to about 40° C., with aqueous ammonium carbonate in an amount from about 5 to about 25 times the weight of the lithium oxide present in the calcined lithium-bearing silicate, thereby to solubilize its lithium content in water and to remove the sodium from the anisometric sodic zeolite produced, regenerating thereby the sodium required in the decomposing step, and separating the solid residue containing an hydrated ammonium aluminosilicate from the lithium carbonate-bearing solution; (c) Insolubilizing the lithium content of the solution obtained in the leaching step by heating and agitating said solution at a temperature from about 60° C. to about 100° C., to drive off carbon dioxide and ammonia gases returning said gases to the leaching step, and separating crystalline lithium carbonate from the mother liquor, causticizing said mother liquor at around 80° C. with an alkaline earth hydroxide, to convert its sodium carbonate content into sodium hydroxide, returning said sodium hydroxide to the decomposing step to react anew with fresh calcined lithium-bearing silicate; and (d) Recovering separately lithium carbonate and a by-product consisting of an anisometric ammoniated zeolite produced in the leaching step, and heating said ammoniated zeolite at above around 400° C., to evolve its ammonia as a gas, returning said regenerated gas to the leaching step.

13. A process, as defined in claim 1, wherein the calcined lithium-bearing silicate is beta spodumene.

14. A process, as defined in claim 1, wherein the lithium-bearing silicate treated is a mineral selected from the group consisting of petalite, eucryptite and lepidolite, previously calcined to above about 680° C., 980° C., and 850° C., respectively.

15. A process for extracting lithium from a hydrothermal reaction product of a lithium-bearing silicate with an aqueous chemical selected from the group consisting of sodium hydroxide, sodium pyroborate, sodium orthoborate, sodium sulfides and sodium silicates, comprising, leaching said reaction mixture with an aqueous solution of ammonium carbonate thereby to extract the lithium content as lithium carbonate and the sodium content as sodium carbonate into solution free from the solid residue and separating the solution from the solid residue and removing the lithium and sodium content from the solution.

16. A method of preparing a calcined lithium-bearing silicate to a state from which the lithium values may be recovered, comprising, reacting said silicate hydrothermically with an aqueous solution of a chemical selected from the group consisting of sodium hydroxide, sodium pyroborate, sodium orthoborate, sodium sulphides and sodium silicates at a temperature within the range from about 70° C. to about 130° C., the chemical being used in an amount from about 1.1 to about 3.5 times the stoichiometric amount required to react with the lithium present in the charge for a time within the range from about 6 to about 48 hours thereby to produce an aqueous mixture containing a silicated lithium compound and sodium aluminosilicate.

References Cited in the file of this patent

UNITED STATES PATENTS

| 1,355,381 | Blackmore | Oct. 12, 1920 |
| 2,924,507 | Peterson | Feb. 9, 1960 |

FOREIGN PATENTS

| 596,302 | Canada | Apr. 19, 1960 |

UNITED STATES PATENT OFFICE
CERTIFICATE OF CORRECTION

Patent No. 3,112,170         November 26, 1963

Maurice Archambault et al.

It is hereby certified that error appears in the above numbered patent requiring correction and that the said Letters Patent should read as corrected below.

In the grant, lines 3 to 5, for "assignors to Department of Natural Resources of the Province of Quebec, of Quebec, Quebec, Canada" read -- assignors to Ministere des Richesses Naturelles, Province de Quebec, of Quebec, Quebec, Canada --; lines 14 and 15, for "Department of Natural Resources of the Province of Quebec, its successors" read -- Ministere des Richesses Naturelles, Province de Quebec, its successors --; in the heading to the printed specification, lines 6 to 8, for "assignors to Department of Natural Resources of the Province of Quebec, Quebec, Quebec, Canada" read -- assignors to Ministere des Richesses Naturelles, Province de Quebec, Quebec, Quebec, Canada --; column 10, lines 64 to 67, for "in which there is present an amount of ammonium carbonate from 5 to 25 times the weight of the lithium oxide present in the calcined lithium-bearing silicate gases" read -- returning said gases to the leaching step, separating crystalline lithium carbonate from the mother liquor --.

Signed and sealed this 4th day of August 1964.

(SEAL)
Attest:

ERNEST W. SWIDER         EDWARD J. BRENNER
Attesting Officer         Commissioner of Patents